United States Patent [19]

Zackrisson

[11] Patent Number: 4,527,978
[45] Date of Patent: Jul. 9, 1985

[54] DRIVESHAFT
[75] Inventor: Barry L. Zackrisson, Toledo, Ohio
[73] Assignee: Dana Corporation, Toledo, Ohio
[21] Appl. No.: 579,350
[22] Filed: Feb. 13, 1984
[51] Int. Cl.³ .............................................. F16C 3/00
[52] U.S. Cl. ..................................... 464/183; 464/182
[58] Field of Search ................................ 464/179–183

[56] References Cited
U.S. PATENT DOCUMENTS

| | | | |
|---|---|---|---|
| 2,291,420 | 7/1942 | Swenson | 464/183 X |
| 3,146,611 | 9/1964 | Fox | 464/183 |
| 3,152,458 | 10/1964 | Simonin | 464/183 |
| 4,218,895 | 8/1980 | Smith et al. | 464/183 X |
| 4,348,874 | 9/1982 | Muller et al. | 464/183 X |

Primary Examiner—John Petrakes
Attorney, Agent, or Firm—Robert H. Johnson; Robert M. Leonardi

[57] ABSTRACT

A driveshaft having a heat-treated aluminum alloy tube and a heat-treated aluminum alloy connection member partially telescoped within each end of the tube and joined to it by welding. The tube has a constant outside diameter and a wall thickness which is constant throughout most of the length and which increases adjacent each end.

11 Claims, 2 Drawing Figures

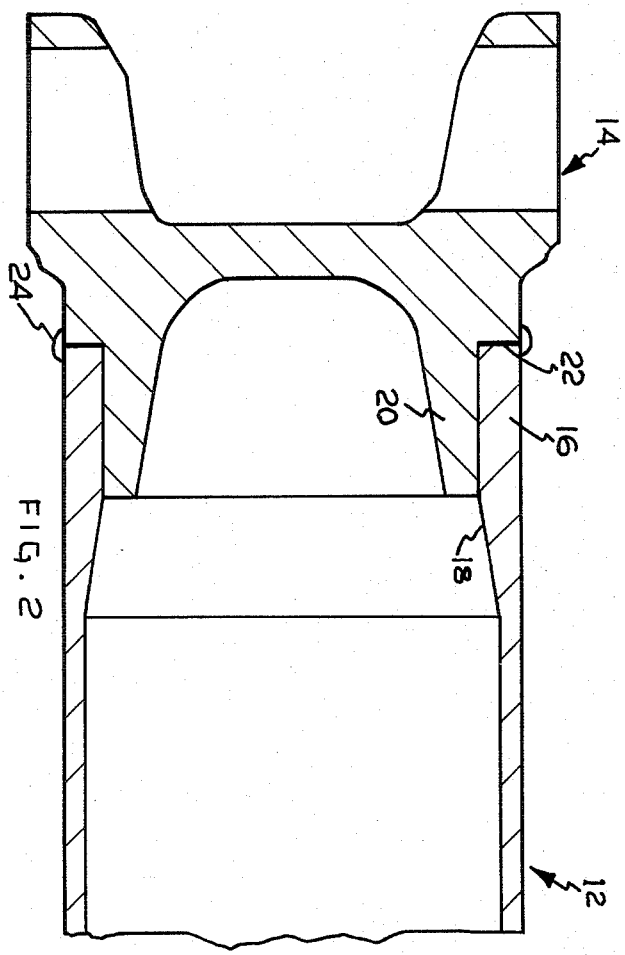
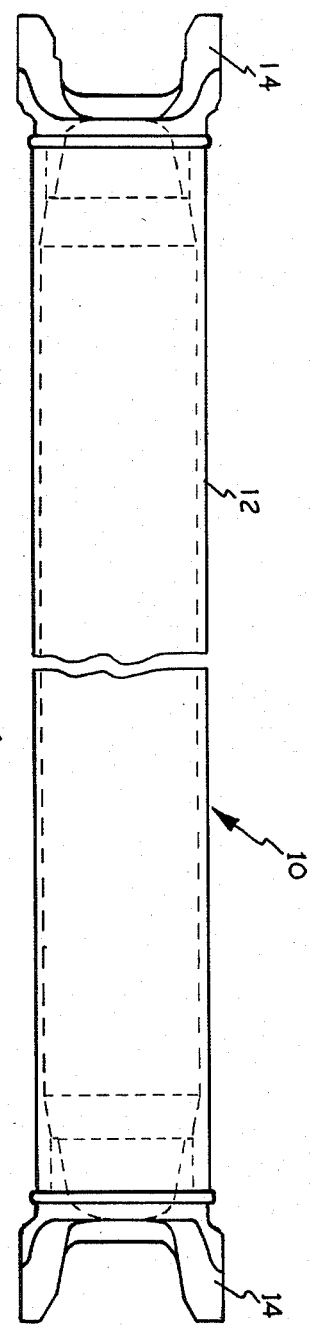
FIG. 1
FIG. 2

DRIVESHAFT

BACKGROUND OF THE INVENTION

This invention relates to driveshafts, and more specifically to hollow aluminum alloy driveshafts.

In order to reduce the weight of a vehicle, lighter weight materials are being substituted for materials conventionally used in many applications. One application where a significant weight savings can be made is the substitution of an aluminum alloy for steel in the driveshaft or driveshafts of a vehicle. In a specific example of which I am aware, it was possible to reduce the weight of the driveshafts in a vehicle by 13 pounds (11.81 kilograms) for a 40% saving in weight by substituting aluminum alloy for steel in the driveshafts.

In my improved thin wall construction it is possible to reduce the weight of the driveshafts in the above example by another 1½ pounds (1.36 kilograms) for an additional 7.7% saving in weight. I have found that the wall thickness necessary to transmit a given torque through an aluminum alloy tube can be reduced if the tube is hardened, and thus strengthened, by heat-treating. However, since the yoke portions of universal joints are joined to each end of the tube by welding, the tube loses substantially all of its hardness and strength due to the heat-treating in the area of the welds. Further, the areas of the tube adjacent the welds cannot be re-hardened by heat-treating without causing undesirable distortion of the yokes which are machined from heat-treated aluminum alloy. Therefore, I have provided a hardened aluminum alloy tube with the minimum wall thickness necessary to carry a given torque throughout most of its length. In the areas adjacent the welds where the tube has its hardness reduced due to losing the effect of the heat-treating in the process of welding the wall thickness is increased enough to transmit the given torque through an aluminum alloy tube without any increased hardness or strength due to heat-treating.

BRIEF SUMMARY OF THE INVENTION

This invention concerns a hollow driveshaft for a vehicle. The driveshaft includes an aluminum alloy tube which is hardened by heat-treating and has a constant outside diameter along its entire length. The tube has a constant wall thickness along most of its length and an increased wall thickness adjacent each end of the tube. Separate connectors are partially telescoped in each end of the tube and joined to the tube by welding.

It is a principal object of my invention to provide an improved lightweight driveshaft.

The above and other objects, features and advantages of my invention will become apparent upon consideration of the detailed description and appended drawing.

BRIEF DESCRIPTION OF THE DRAWING

FIG. 1 shows my improved lightweight driveshaft, and

FIG. 2 is an enlarged fragmentary sectional view of one end of the driveshaft shown in FIG. 1.

DETAILED DESCRIPTION OF THE PREFERRED EMBODIMENT

Referring to the drawing, reference numeral 10 denotes a hollow drive shaft which includes a tubular portion or tube 12 and a pair of connection members 14 partially telescoped within the ends of tube 12 and joined to tube 12 by welding.

Tube 12 has a constant diameter throughout its entire length and a uniform wall thickness 16 throughout most of its length, except the wall thickness adjacent each end of tube 12 is increased. The area of increased wall thickness 16 extends back from each end of tube 12 approximately one inch (2.54 centimeters) and then goes to a smooth and gradual transition 18 to a thinner wall thickness.

A number of different aluminum alloys can be used for tube 12, but I prefer the aluminum alloy generally identified as 6061 which has been heat-treated to a hardness of T6.

Connected to each end of tube 12 is a connection member 14 which can be the yoke portion of a universal joint, for example. Yoke 14 includes a reduced diameter portion 20 which extends into tube 12 as shown and a shoulder 22 which abuts one end of tube 12 in order to accurately position yoke 14 at one end of tube 12 and partially telescoped within tube 12. Yoke 14 is joined to tube 12 by welding at 24 by the heliarc process or other suitable welding process.

Yoke 14 preferably is machined from 6061 aluminum alloy stock, although other aluminum alloys could be used, which has been heat treated to a hardness of T6.

As will be appreciated, the portion of tube 12 and yoke 14 in the area of weld 24 will loose most, if not all, of their hardness and strength due to heat-treating so that the hardness of tube 12 and yoke 14 in the area of weld 24 will be approximately T1. Since the weld and the surrounding area cannot be heat-treated after the weld is made because any such heat-treating will cause distortion of yoke 14 and tube 12, it is necessary that the wall thickness of tube 12 in area 16 be increased sufficiently to carry the given torque, based upon the strength of the aluminum alloy being used in a substantially unheat-treated condition. That is, with a hardness between T0 and T1 and the strength associated with such hardness.

My invention is subject to various modifications and changes so the limits of it should be determined from the appended claims as construed in light of the prior art.

I claim:

1. A driveshaft comprising a heat-treated aluminum alloy tube with first and second ends, said tube having a constant wall thickness throughout most of its length and an increased wall thickness adjacent each end, the outside diameter of said tube at each end being at least as great as the outside diameter of said tube throughout its length, a first aluminum alloy connection member partially telescoped within said first end of said tube and joined to said tube by welding, and a second aluminum alloy connection member partially telescoped within said second end of said tube and joined to said tube by welding, wherein the hardness of each end of said tube is about T1 or less adjacent each end thereof.

2. A driveshaft as set forth in claim 1 wherein the increased wall thickness of said tube extends back approximately one inch (2.54 centimeters) from each end of said tube.

3. A driveshaft as set forth in claim 1 wherein the hardness of said tube varies from T6 adjacent the middle thereof to T1 or less adjacent each end thereof.

4. A driveshaft as set forth in claim 1 wherein the transition between wall thicknesses of said tube is smooth and gradual.

5. A driveshaft as set forth in claim 1 wherein each of said connection members is a machined part.

6. A driveshaft as set forth in claim 1 wherein the hardness of said tube varies from T1 or less adjacent each end thereof to T6 away from said ends and the wall thicknesses of said tube are substantially the minimum wall thicknesses necessary to transmit a given torque through said tube.

7. A driveshaft as set forth in claim 6 wherein the increased wall thickness of said tube extends back approximately one inch (2.54 centimeters) from each end of said tube.

8. A driveshaft as set forth in claim 7 wherein each of said connection members is a machined yoke for a universal joint.

9. A driveshaft as set forth in claim 8 wherein said tube and said yokes are 6061-T6 aluminum alloy.

10. A driveshaft as set forth in claim 9 wherein said tube has a constant outside diameter throughout its length.

11. A driveshaft as set forth in claim 1 wherein said tube has a constant outside diameter throughout its length.

* * * * *